US012186610B2

(12) United States Patent
Zhang et al.

(10) Patent No.: US 12,186,610 B2
(45) Date of Patent: Jan. 7, 2025

(54) OPERATION CONTROL METHOD SUITABLE FOR FIRE EXTINGUISHING SYSTEM OF EXTRA-HIGH VOLTAGE CONVERTER STATION

(71) Applicants: STATE GRID ANHUI ELECTRIC POWER RESEARCH INSTITUTE, Hefei (CN); STATE GRID CORPORATION OF CHINA, Beijing (CN); STATE POWER ECONOMIC RESEARCH INSTITUTE, Beijing (CN)

(72) Inventors: Jiaqing Zhang, Hefei (CN); Yubiao Huang, Hefei (CN); Yong Huang, Hefei (CN); Jinzhong Li, Hefei (CN); Pengcheng Yang, Hefei (CN); Jing Tan, Hefei (CN); Liufang Wang, Hefei (CN); Dengfeng Cheng, Hefei (CN); Yu Tian, Hefei (CN); Yanguo Ke, Hefei (CN); Sha Luo, Hefei (CN); Jia Xie, Hefei (CN); Minghao Fan, Hefei (CN); Wei Li, Hefei (CN); Yi Guo, Hefei (CN); Fengju Shang, Hefei (CN); Rui Liu, Hefei (CN); Wen Su, Hefei (CN)

(73) Assignees: STATE GRID ANHUI ELECTRIC POWER RESEARCH INSTITUTE, Hefei (CN); STATE GRID CORPORATION OF CHINA, Beijing (CN); STATE POWER ECONOMIC RESEARCH INSTITUTE, Beijing (CN)

( * ) Notice: Subject to any disclaimer, the term of this patent is extended or adjusted under 35 U.S.C. 154(b) by 0 days.

(21) Appl. No.: 18/704,942

(22) PCT Filed: Jun. 18, 2021

(86) PCT No.: PCT/CN2021/100777
§ 371 (c)(1),
(2) Date: Apr. 26, 2024

(87) PCT Pub. No.: WO2021/259148
PCT Pub. Date: Dec. 30, 2021

(65) Prior Publication Data

US 2024/0350848 A1 Oct. 24, 2024

(30) Foreign Application Priority Data

Jun. 22, 2020 (CN) ......................... 202010575003.3

(51) Int. Cl.
*A62C 37/44* (2006.01)
*A62C 3/16* (2006.01)
(Continued)

(52) U.S. Cl.
CPC ................ *A62C 37/44* (2013.01); *A62C 3/16* (2013.01); *A62C 5/02* (2013.01); *A62C 31/12* (2013.01)

(58) Field of Classification Search
CPC ........... A62C 3/16; A62C 31/05; A62C 31/12; A62C 5/02; A62C 5/022; A62C 99/036; B64U 2101/47
See application file for complete search history.

(56) References Cited

U.S. PATENT DOCUMENTS 3,588,893 A * 6/1971 McCloskey .......... A62C 99/009 340/630
6,095,252 A * 8/2000 Draugelates ............. A62C 3/16 169/58
(Continued)

FOREIGN PATENT DOCUMENTS

CN 201710860 U 1/2011
CN 105457195 A 4/2016
(Continued)

OTHER PUBLICATIONS

Fan Ming-Hao, et al., Experimental Study of Combustion Characteristics of a Typical Transformer Oil, East China Electric Power, 2013, pp. 1865-1870, vol. 41 No. 9.

(Continued)

*Primary Examiner* — Joseph A Greenlund

(74) *Attorney, Agent, or Firm* — Bayramoglu Law Offices LLC

(57) ABSTRACT

An operation control method suitable for a fire extinguishing system of an extra-high voltage converter station is provided. The method includes: after an upper computer control system receives a sound-light alarm signal, an alarm position signal, and a switch position dividing signal, starting a spray range prediction analysis subsystem for a fixed fire monitor; determining, by the spray range prediction analysis subsystem for the fixed fire monitor based on an external wind direction and an external wind speed, whether a range of a fire monitor effectively covers an entire area of a converter transformer; and if yes, automatically presetting a first fire monitor to which a first compressed air foam generation subsystem belongs and a second fire monitor to which a second compressed air foam generation subsystem belongs; or if no, replacing a fire monitor with a mobile fire-fighting robot to extinguish a fire.

10 Claims, 8 Drawing Sheets

(51) Int. Cl.
*A62C 5/02* (2006.01)
*A62C 31/12* (2006.01)

(56) References Cited

U.S. PATENT DOCUMENTS

| | | | | |
|---|---|---|---|---|
| 11,369,820 | B2 * | 6/2022 | Gladstone | H04N 7/188 |
| 2011/0186657 | A1 * | 8/2011 | Haviland | F41B 9/0087 239/722 |
| 2011/0203813 | A1 * | 8/2011 | Fenton | A62C 99/0072 239/419 |
| 2012/0118591 | A1 * | 5/2012 | Yen | A62C 37/36 169/47 |
| 2014/0083723 | A1 * | 3/2014 | Danielsen | A62C 3/16 169/45 |
| 2016/0129289 | A1 * | 5/2016 | Cordani | F03D 80/80 169/46 |
| 2017/0113787 | A1 * | 4/2017 | Hein | B64U 30/30 |
| 2018/0221697 | A1 * | 8/2018 | Shively | A62C 37/50 |
| 2019/0134440 | A1 * | 5/2019 | Carter | F04B 17/06 |
| 2019/0147715 | A1 * | 5/2019 | Noras | G05D 1/0257 701/22 |
| 2021/0162247 | A1 * | 6/2021 | Kovalev | A62C 31/12 |
| 2021/0236865 | A1 * | 8/2021 | Hut | A62C 37/36 |
| 2021/0346740 | A1 * | 11/2021 | Jiang | A62C 5/022 |
| 2022/0118297 | A1 * | 4/2022 | Zhang | A62C 37/04 |
| 2022/0126456 | A1 * | 4/2022 | Matsumura | G05D 1/0094 |
| 2023/0124927 | A1 * | 4/2023 | Ezra | A62C 31/28 169/61 |
| 2023/0241433 | A1 * | 8/2023 | Petermann | A62C 3/16 169/54 |

FOREIGN PATENT DOCUMENTS

| | | | | |
|---|---|---|---|---|
| CN | 106267627 | A | | 1/2017 |
| CN | 206979869 | U | | 2/2018 |
| CN | 109568856 | A | | 4/2019 |
| CN | 109603038 | A | | 4/2019 |
| CN | 109701182 | A | | 5/2019 |
| CN | 110639144 | A | | 1/2020 |
| CN | 110882501 | A | | 3/2020 |
| CN | 111068208 | A | | 4/2020 |
| CN | 111790082 | A | | 10/2020 |
| CN | 111068208 | B | * | 2/2021 |
| GR | 1002685 | B | | 5/1997 |
| KR | 100840837 | B1 | | 6/2008 |
| RU | 2426603 | C1 | | 8/2011 |
| WO | 2004103477 | A1 | | 12/2004 |

OTHER PUBLICATIONS

Jian-Tao Li, et al., Experimental Research on Fire Suppression of Oil Immersed Power Transformer, Fire Science and Technology, 2012, pp. 1306-1309, vol. 31 No. 12.

Xianzhai Qu, et al., Analysis on Causes of Transformer Fire and Explosion, Safety Health & Environment, 2010, pp. 11-12.

Shenyang Fire Brigade and Shenyang Fire Research Institute of the Ministry of Public Security, Discussion on Fire Cause and Exploration Method of Oil Immersed Transformer, Building Electrical & Intelligent System, 2006, pp. 45-46.

Wangchu Zhao, et al., Fire Prevention of Power Transformer, Electric Power Construction, 1996, pp. 27-29,31.

Gunnar Heskestad, et al., Pool Fires of Transformer Oil Sinking into a Rock Bed, Fire Safety Journal, 1997, pp. 33-46, vol. 28.

* cited by examiner

OPERATION CONTROL METHOD SUITABLE FOR FIRE EXTINGUISHING SYSTEM OF EXTRA-HIGH VOLTAGE CONVERTER STATION

CROSS-REFERENCE TO THE RELATED APPLICATIONS

This application is the national phase entry of International Application No. PCT/CN2021/100777, filed on Jun. 18, 2021, which is based upon and claims priority to Chinese Patent Application No. 202010575003.3, filed on Jun. 22, 2020, the entire contents of which are incorporated herein by reference.

TECHNICAL FIELD

The present disclosure relates to the field of an operation strategy of a fire extinguishing system, and more specifically, to an operation control method suitable for a fire extinguishing system of an extra-high voltage converter station.

BACKGROUND

As an important facility for ensuring long-distance direct current transmission, an extra-high voltage converter station undertakes a national direct current power transmission task and is a major national infrastructure. A converter transformer in the extra-high voltage converter station is large oil-bearing equipment and has an obvious fire risk. A plurality of fire accidents of converter transformers have shown that a fire of the converter transformer is characterized by rapid development and a large scale, and may endanger safety of the entire converter station if it is not effectively controlled in time, causing an immeasurable economic loss and social impact. A fire extinguishing system is disposed in an area of the converter transformer to ensure a safety level of the area. A fire monitor extinguishing system is a common fire extinguishing system used in the converter station. However, the area of the converter transformer belongs to a high-voltage area, which is approximately 800 KV. As a result, when the fire occurs, on-site operation and maintenance personnel need to manually power off a corresponding valve group before performing a fire extinguishing operation on the converter transformer. The fire extinguishing operation involves a series of operations and actions such as opening a corresponding partition selection valve, operating a fire monitor control system, and performing hot standby preparation on a system of a compressed air foam generation device, which brings great pressure to the operation and maintenance personnel in the station to carry out the fire extinguishing operation. This may cause delay of fire extinguishing time, a manual misoperation, and other risks, which seriously affects a fire extinguishing effect of the converter transformer.

A small amount of research has been conducted in China and abroad on a combustion characteristic and a mechanism of an oil fire in the converter transformer mainly based on the fire accidents of the converter transformer. Published by Anhui Electric Power Research Institute, the literature *Experimental Study of Combustion Characteristics of a Typical Transformer Oil* [*J*]. East China Electric Power, 2013, 41 (9): 1865-1870, studied typical combustion characteristic parameters of transformer oil under oil pans of different sizes using a full-scale experimental platform for a heat release rate. Published by Tianjin Fire Brigade, the literature *Experimental Research on Fire Suppression of Oil Immersed Power Transformer* [*J*]. Fire Science and Technology, 2012, 31 (12): 1306-1309, conducted research on an oil pool fire of a transformer using a small-scale simulation experiment. Published by Shandong Haipu Labor Safety Technology Consulting Co., Ltd., the literature *Analysis on Causes of Transformer Fire and Explosion* [*J*]. Safety Health & Environment, 2010, 10 (4): 11-12, elaborated ten reasons for a transformer fire and explosion. Published by Shenyang Fire Brigade and Shenyang Fire Research Institute of the Ministry of Public Security, the literature *Discussion on Fire Cause and Exploration Method of Oil Immersed Transformer* [*C*]// Meeting of the Electrical Fire Protection Committee of China Fire Protection Association and 13th Seminar on Electrical Fire Protection, 2006, analyzed a cause and a mode of a fire of an oil immersed transformer from perspectives of a structure and a working principle of the oil immersed transformer. Published by Electric Power Information Research Institute, the literature *Fire Prevention of Power Transformer* [*J*]. Electric Power Construction, 1996 (9): 27-29, analyzed ignition and combustion mechanisms of the transformer. Published by American Factory Insurance Alliance, the literature Heskestad, G. and P.H. Dobson, Pool fires of transformer oil sinking into a rock bed. Fire Safety Journal, 1997. 28 (1): p. 33-46, studied combustion characteristics of an oil pool fire of transformer oil. Published by International Council on Large Electric Systems, the safety guidelines for fire prevention of the transformer describe causes of a transformer fire in detail.

In summary, the prior art has not yet studied an operation control method suitable for a fire extinguishing system of the extra-high voltage converter station. In order to avoid a manual misoperation, achieve instant and efficient fire extinguishing, and reduce pressure on operation and maintenance personnel in the station, it is necessary to design a control method for the fire extinguishing system.

SUMMARY

The present disclosure is intended to solve a technical problem that the prior art lacks an operation control method suitable for a fire extinguishing system of an extra-high voltage converter station, to avoid a manual misoperation, achieve instant and efficient fire extinguishing, and reduce pressure on operation and maintenance personnel in the station.

The present disclosure solves the above technical problem through the following technical means: an operation control method suitable for a fire extinguishing system of an extra-high voltage converter station. The fire extinguishing system of the extra-high voltage converter station includes a first foam fire monitor extinguishing system, a second foam fire monitor extinguishing system, and an upper computer control system, the first foam fire monitor extinguishing system includes a first fire monitor and a first compressed air foam generation subsystem, and the second foam fire monitor extinguishing system includes a second fire monitor and a second compressed air foam generation subsystem. The method includes:

- after the upper computer control system receives a sound-light alarm signal, an alarm position signal, and a switch position dividing signal, starting a spray range prediction analysis subsystem for a fixed fire monitor;
- determining, by the spray range prediction analysis subsystem for the fixed fire monitor based on an external wind direction and an external wind speed, whether a range of a fire monitor effectively covers an entire area of a converter transformer; and if yes, starting the first compressed air foam generation subsystem and the second compressed air foam generation subsystem, such that the first fire monitor to which the first compressed air foam generation subsystem belongs and the second fire monitor to which the second compressed air foam generation subsystem belongs are automatically preset, and fixing a remote stand of the fire monitor to extinguish a fire; or if no, if the first fire monitor does not meet a range requirement, replacing the first fire monitor with a mobile fire-fighting robot to extinguish a fire; if the second fire monitor does not meet a range requirement, replacing the second fire monitor with a mobile fire-fighting robot to extinguish a fire; or if both the first fire monitor and the second fire monitor do not meet a range requirement, replacing the first fire monitor and the second fire monitor with two mobile fire-fighting robots respectively to extinguish a fire.

The present disclosure receives an alarm signal by using the upper computer control system and starts the spray range prediction analysis subsystem for the fixed fire monitor to determine whether the range of the fire monitor effectively covers the entire area of the converter transformer. A targeted fire extinguishing operation is carried out based on a determining result, which avoids a manual misoperation, achieve instant and efficient fire extinguishing, and reduce pressure on station operation and maintenance personnel in the station.

Further, that the upper computer control system receives a sound-light alarm signal, an alarm position signal, and a switch position dividing signal includes: obtaining signal data from two cable thermal detectors and two flame detectors through alarm coupling, performing, by a combined alarm controller, independent determining based on a two-out-of-three principle to output the sound-light alarm signal and the alarm position signal, and outputting the switch position dividing signal through an on-off action by a circuit breaker of a single valve group converter transformer and automatic power off by the single valve group converter transformer.

Further, the two-out-of-three principle includes: at least one flame detector emits an action signal, indicating that action signal output is present in the flame detector side; the two flame detectors act as one output to form three outputs together with the two cable thermal detectors; and when at least two of the three outputs emit an action signal, the combined alarm controller alarms.

Further, the spray range prediction analysis subsystem for the fixed fire monitor is built in the upper computer control system.

Further, the determining, by the spray range prediction analysis subsystem for the fixed fire monitor based on an external wind direction and an external wind speed, whether a range of a fire monitor effectively covers an entire area of a converter transformer includes:

establishing a confidence determining model for a wind environment fluctuation;

determining the external wind direction and the external wind speed based on the confidence determining model for the wind environment fluctuation;

establishing a prediction model for effective coverage performance of the fixed fire monitor; and inputting the external wind direction and the external wind speed that are determined by the confidence determining model for the wind environment fluctuation into the prediction model for the effective coverage performance of the fixed fire monitor to determine whether the range of the fire monitor effectively covers the entire area of the converter transformer.

Further, the establishing a confidence determining model for a wind environment fluctuation includes:

$$v_{basic} = \frac{\sum_{t_i=1}^{t_i=n} v_{f_{t_i}}}{n},$$

obtaining a basic wind speed according to a formula where $v_{basic}$ represents the basic wind speed;

$$v_{f_{t_i}}$$

represents a wind speed at a time point $t_i$; and n represents a quantity of times that a wind speed detector takes a value;

obtaining a confidence value of a wind speed fluctuation according to a formula $$\eta = \left|\frac{v_{f_{t_i}} - v_{basic}}{v_{basic}}\right|,$$

where $\eta$ represents the confidence value of the wind speed fluctuation;

obtaining a basic wind direction according to a formula $$\beta_{basic} = \frac{\sum_{t_i=1}^{t_i=n} \beta_{t_i}}{n},$$

where $\beta_{basic}$ represents the basic wind direction; and $\beta_{t_i}$ represents a wind direction at the time point $t_i$; and obtaining a confidence value of a wind direction angle fluctuation according to a formula $$\lambda = \left|\frac{\beta_{t_i} - \beta_{basic}}{\beta_{basic}}\right|,$$

where $\lambda$ represents the confidence value of the wind direction angle fluctuation.

Further, the determining the external wind direction and the external wind speed based on the confidence determining model for the wind environment fluctuation includes:

when both the confidence value $\eta$ of the wind speed fluctuation and the confidence value $\lambda$ of the wind direction angle fluctuation are less than a preset value, determining that the external wind speed and the external wind direction are stable, using the basic wind speed $v_{basic}$ as the external wind speed, and using the basic wind direction $\beta_{basic}$ as the external wind direction; and when both the confidence value $\eta$ of the wind speed fluctuation and the confidence value $\lambda$ of the wind direction angle fluctuation are greater than the preset value, determining that the external wind speed or the external wind direction fluctuates greatly, and a degree of an impact of an external wind environment on the fire monitor also increases, obtaining 12 sectorial azimuth zones through division by a wind direction and wind speed probability statistical model by taking every 30° as a statistical azimuth to take wind direction statistics, taking a wind direction with a highest statistical probability as a reference wind direction, taking a statistical mean of wind speeds in a sectorial zone in which the reference wind direction is located as a reference wind speed, using the reference wind speed as the external wind speed, and using the reference wind direction as the external wind direction.

Further, the wind direction and wind speed probability statistical model includes:

obtaining a frequency of a wind direction appearing in an azimuth i according to a formula $$f_i = \frac{n_i}{k} * 100\%,$$

where $f_i$ represents the frequency of the wind direction appearing in the azimuth i; $n_i$ represents a quantity of times that the wind direction appears in the azimuth i; and k represents a total quantity of azimuth records of the wind direction;

obtaining a highest frequency of the wind direction in the 12 sectorial azimuth zones according to a formula $f_{max}=\mathrm{MAX}[f_1, f_2, \ldots, f_{12}]$, where $f_1$ represents a frequency of the wind direction in an azimuth 1; $f_2$ represents a frequency of the wind direction in an azimuth 2; and $f_{max}$ represents the highest frequency of the wind direction in the 12 sectorial azimuth zones; and obtaining an average wind speed within the azimuth i according to a formula $$\overline{v}_i = \frac{\sum_{x=1}^{x=n_i} v_{i_x}}{n_i},$$

where $\overline{v}_i$ represents the average wind speed within the azimuth i; and $v_i$, represents a wind speed of an $x^{th}$ measurement within the azimuth i.

Further, the establishing a prediction model for effective coverage performance of the fixed fire monitor includes:

obtaining an initial spray speed of the fire monitor according to a formula $$v_p = \frac{Q_{flow}\varphi}{\pi r^2},$$

wherein r represents a radius of a barrel, $\varphi$ represents a gas-liquid ratio, and $Q_{flow}$ represents a flow of foam mixed liquid;

obtaining a speed under a coupling condition of the fire monitor and a wind speed according to a formula $v_o = \sqrt{(v_p\cos\theta+v_f\cos\beta)^2+(v_p\sin\theta+v_f\sin\beta)^2}$, where $v_o$ represents the speed under the coupling condition of the fire monitor and the wind speed, $v_p$ represents the initial spray speed of the fire monitor, $\theta$ represents an initial spray angle with a value range of [0°, 360°], $v_f$ represents the external wind speed, and $\beta$ represents the external wind direction with a value range of [0°, 360°];

obtaining a theoretical range of a coverage area of the fire monitor according to a formula $L=v_0t$, where t represents required time from release of foam to falling of the foam to the ground and $$t = \sqrt{\frac{2H_1}{g}},$$

$H_1$ represents a layout height of the fire monitor, and & represents a gravity acceleration;

obtaining an actual range of the coverage area of the fire monitor according to a formula $$L_0 = \lambda\sqrt{(v_p\cos\theta + v_f\cos\beta)^2 + (v_p\sin\theta + v_f\sin\beta)^2}\sqrt{\frac{2H_1}{g}},$$

where $\lambda$ represents a correction coefficient;

obtaining an actual spray angle of the fire monitor under an impact of external wind according to a formula $$\cos\alpha = \frac{v_p\cos\theta + v_f\cos\beta}{v_o};$$

and obtaining an actually required range for a flaming converter transformer according to a formula $$L_{required} = \frac{L_1}{\cos\alpha},$$

where $L_1$ represents a distance from the fire monitor to a farthest side of a firewall of the flaming converter transformer.

Further, the inputting the external wind direction and the external wind speed that are determined by the confidence determining model for the wind environment fluctuation into the prediction model for the effective coverage performance of the fixed fire monitor to determine whether the range of the fire monitor effectively covers the entire area of the converter transformer includes:

when $L_0 \geq L_{required}$, under the initial spray speed and the initial spray angle of the fire monitor, the external wind speed, and the external wind direction, determining that the range of the fire monitor effectively covers the entire area of the converter transformer; or when $L_0 < L_{required}$, under the initial spray speed and the initial spray angle of the fire monitor, the external wind speed, and the external wind direction, determining that the range of the fire monitor cannot effectively cover the entire area of the converter transformer.

The present disclosure has following advantages: The present disclosure receives an alarm signal by using the upper computer control system and starts the spray range prediction analysis subsystem for the fixed fire monitor to determine whether the range of the fire monitor effectively covers the entire area of the converter transformer. A targeted fire extinguishing operation is carried out based on a determining result, which avoids a manual misoperation, achieve instant and efficient fire extinguishing, and reduce pressure on station operation and maintenance personnel in the station.

DETAILED DESCRIPTION OF THE EMBODIMENTS

In order to make the objectives, technical solutions, and advantages of the embodiments of the present disclosure clearer, the following clearly and completely describes the technical solutions in the embodiments of the present disclosure with reference to the embodiments of the present disclosure. Apparently, the described embodiments are some rather than all of the embodiments of the present disclosure. All other embodiments obtained by those of ordinary skill in the art based on the embodiments of the present disclosure without creative efforts should fall within the protection scope of the present disclosure.

Figure 1:
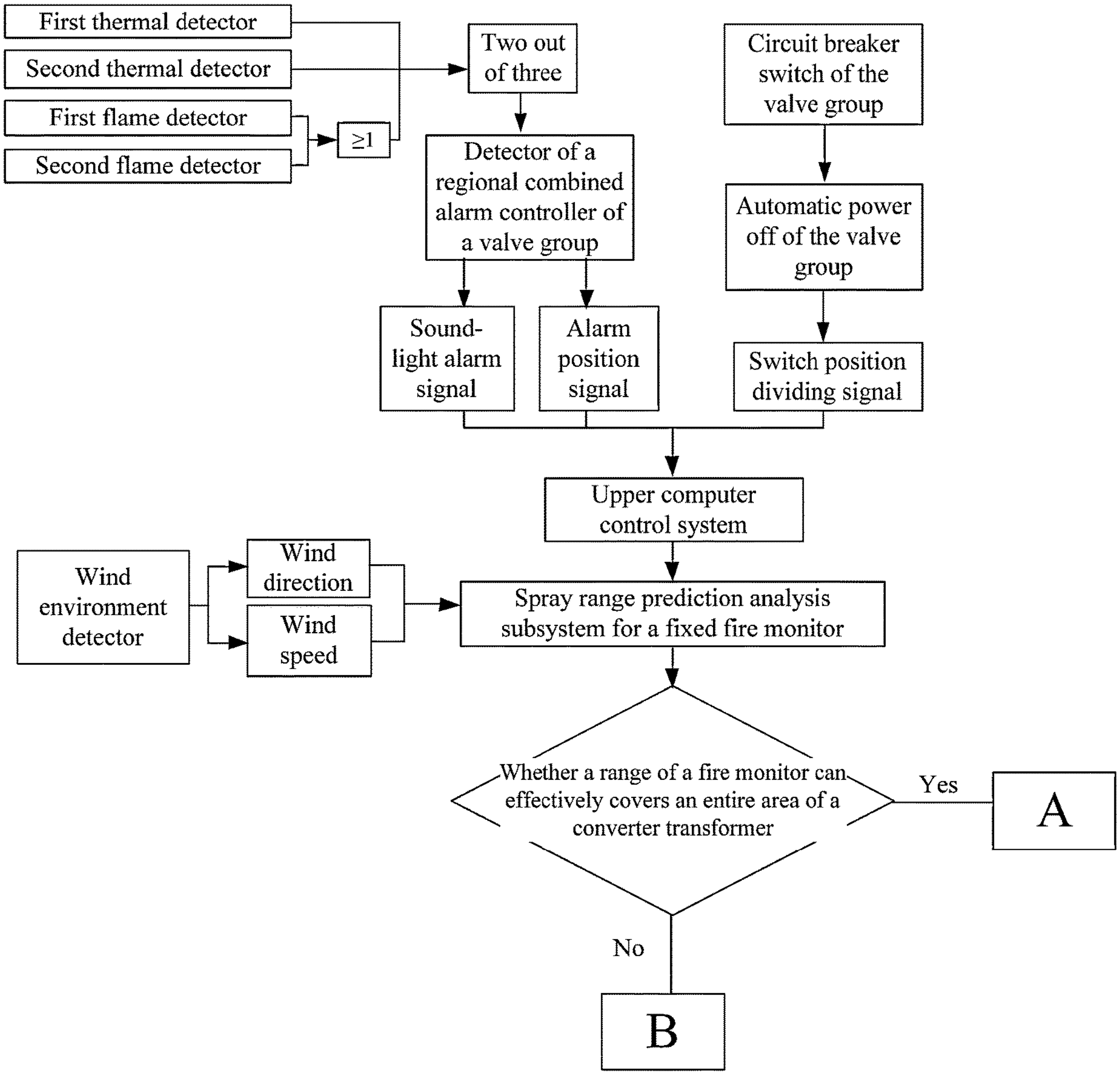
FIG. 1 is a flowchart of an operation control method suitable for a fire extinguishing system of an extra-high voltage converter station according to an embodiment of the present disclosure.
Figure 2:
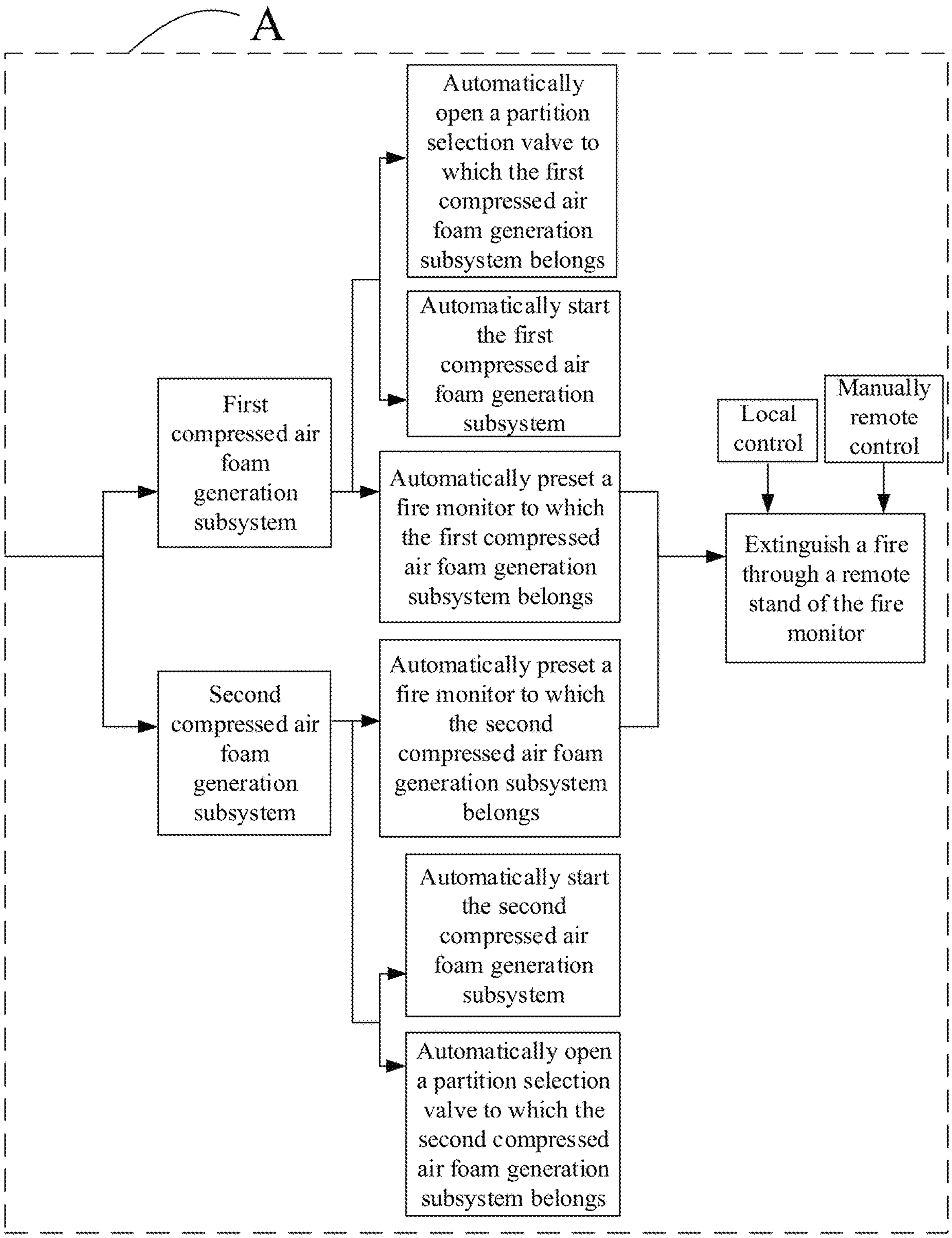
FIG. 2 shows details of part A in a flowchart of an operation control method suitable for a fire extinguishing system of an extra-high voltage converter station according to an embodiment of the present disclosure.
Figure 3:
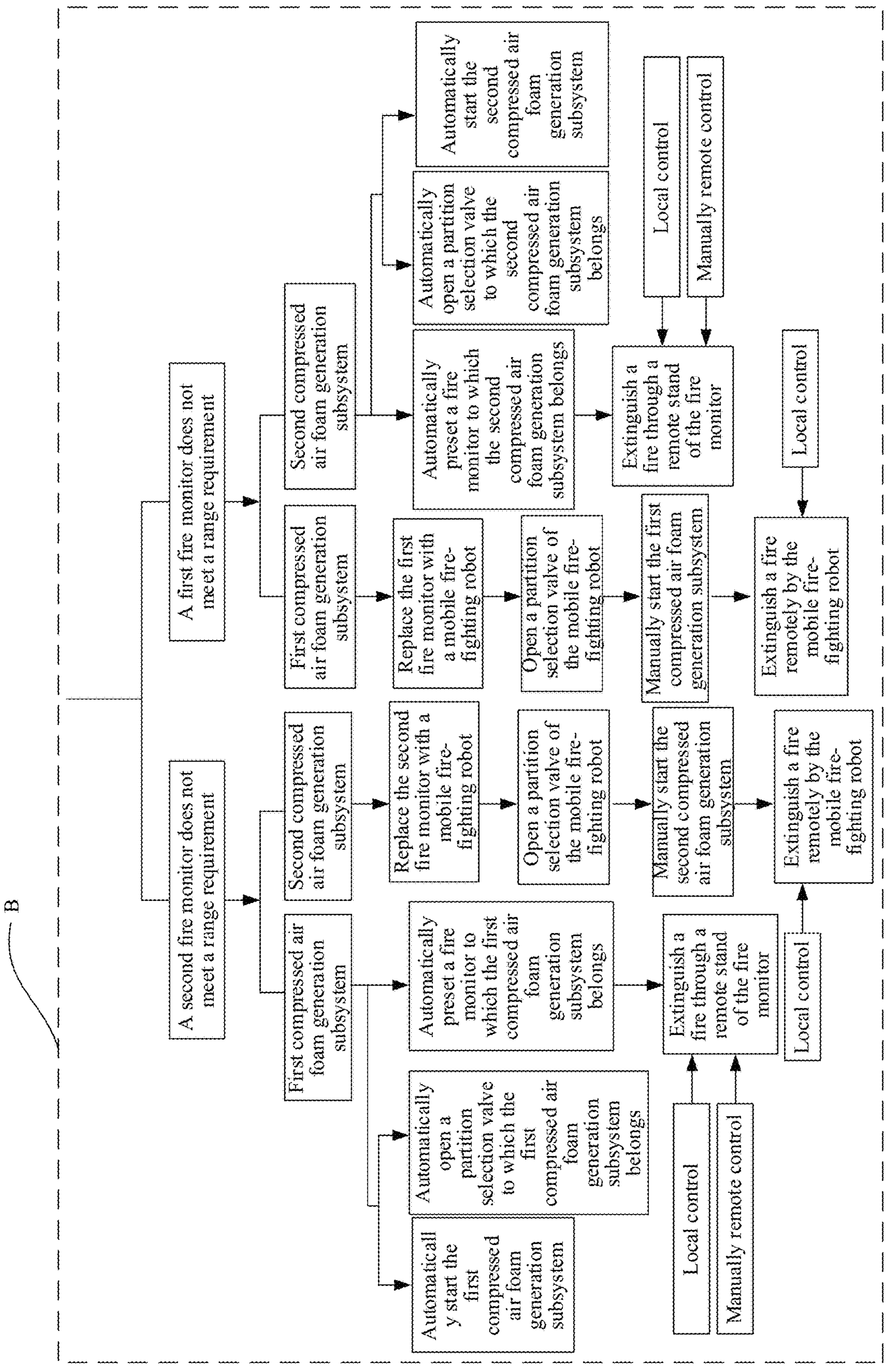
FIG. 3 shows details of part B in a flowchart of an operation control method suitable for a fire extinguishing system of an extra-high voltage converter station according to an embodiment of the present disclosure.
Figure 4:
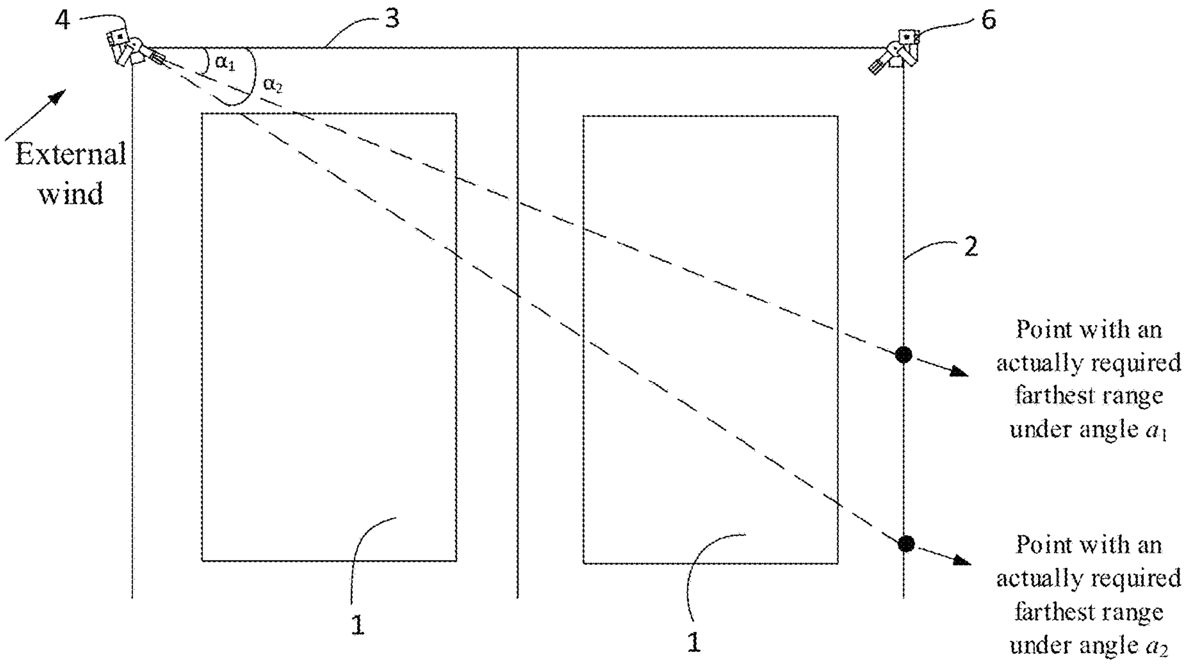
FIG. 4 is a schematic diagram of coupled vector calculation in an operation control method suitable for a fire extinguishing system of an extra-high voltage converter station according to an embodiment of the present disclosure.

As shown FIG. 1 to FIG. 3, an operation control method suitable for a fire extinguishing system of an extra-high voltage converter station includes following steps.

A main body of single valve group converter transformer 100 is equipped with two parallel independent cable thermal detectors: a first thermal detector and a second thermal detector. Two flame detectors are disposed at firewall 2 around converter transformer 1 of each phase: a first flame detector and a second flame detector. When the first flame detector emits an action signal and the first thermal detector emits an action signal, if a “two-out-of-three” condition is met, a combined alarm system emits a sound-light alarm signal. When only the flame detector or only the cable thermal detector emits the action signal, the combined alarm system does not alarm. In addition, when the converter transformer 1 of a phase is abnormal, a circuit breaker switch of the single valve group converter transformer 100 issues a response action. The circuit breaker switch performs position dividing, and the valve group is powered off. The sound-light alarm signal, an alarm position signal, and a circuit breaker switch position dividing signal are transmitted to upper computer control system 8. The upper computer control system 8 starts a spray range prediction analysis subsystem for a fixed fire monitor. The two-out-of-three principle includes: at least one flame detector emits an action signal, indicating that action signal output is present in the flame detector side; the two flame detectors act as one output to form three outputs together with the two cable thermal detectors; and when at least two of the three outputs emit an action signal, a combined alarm controller alarms.

With reference to FIG. 1 to FIG. 3, FIG. 4, and FIG. 5, after being started, the spray range prediction analysis subsystem for the fixed fire monitor determines, based on an external wind direction and an external wind speed, whether a range of a fire monitor effectively covers an entire area of the converter transformer 1. A specific process is as follows:

At first, a confidence determining model for a wind environment fluctuation is established, and the external wind direction and the external wind speed are determined based on the confidence determining model for the wind environment fluctuation. A specific process is as follows:

A basic wind speed is obtained according to formula $$v_{basic}=\frac{\sum_{t_i=1}^{t_i=n} v_{ft_i}}{n}.$$

In the above formula, $v_{basic}$ represents the basic wind speed;

$$V_{ft_i}$$

represents a wind speed at time point $t_i$; and n represents a quantity of times that a wind speed detector takes a value.

A confidence value of a wind speed fluctuation is obtained according to formula $$\eta = \left| \frac{v_{f_{t_i}} - v_{basic}}{v_{basic}} \right|.$$

In the above formula, η represents the confidence value of the wind speed fluctuation.

A basic wind direction is obtained according to formula $$\beta_{basic} = \frac{\sum_{t_i=1}^{t_i=n} \beta_{t_i}}{n}.$$

In the above formula, $\beta_{basic}$ represents the basic wind direction; and $\beta_{t_i}$ represents a wind direction at the time point $t_i$.

A confidence value of a wind direction angle fluctuation is obtained according to formula $$\lambda = \left| \frac{\beta_{t_i} - \beta_{basic}}{\beta_{basic}} \right|.$$

In the above formula, λ represents the confidence value of the wind direction angle fluctuation.

When both the confidence value η of the wind speed fluctuation and the confidence value λ of the wind direction angle fluctuation are less than a preset value, it is determined that the external wind speed and the external wind direction are stable, the basic wind speed $v_{basic}$ is used as the external wind speed, and the basic wind direction $\beta_{basic}$ is used as the external wind direction. The preset value is 0.3.

When both the confidence value η of the wind speed fluctuation and the confidence value λ of the wind direction angle fluctuation are greater than the preset value, it is determined that the external wind speed or the external wind direction fluctuates greatly, and a degree of an impact of an external wind environment on the fire monitor also increases, 12 sectorial azimuth zones are obtained through division by a wind direction and wind speed probability statistical model by taking every 30° as a statistical azimuth to take wind direction statistics, a wind direction with a highest statistical probability is taken as a reference wind direction, a statistical mean of wind speeds in a sectorial zone in which the reference wind direction is located is taken as a reference wind speed, the reference wind speed is used as the external wind speed, and the reference wind direction is used as the external wind direction.

The wind direction and wind speed probability statistical model includes:

obtaining a frequency of a wind direction appearing in azimuth i according to formula $$f_i = \frac{n_i}{k} * 100\%,$$

where $f_i$ represents the frequency of the wind direction appearing in the azimuth i; $n_i$ represents a quantity of times that the wind direction appears in the azimuth i; and k represents a total quantity of azimuth records of the wind direction;

obtaining a highest frequency of the wind direction in the 12 sectorial azimuth zones according to formula $f_{max}=MAX[f_1,f_2, \ldots ,f_{12}]$, where $f_1$ represents a frequency of the wind direction in azimuth 1; $f_2$ represents a frequency of the wind direction in azimuth 2; and $f_{max}$ represents the highest frequency of the wind direction in the 12 sectorial azimuth zones; and obtaining an average wind speed within the azimuth i according to formula $$\overline{v}_i = \frac{\sum_{x=1}^{x=n_i} v_{i_x}}{n_i},$$

where $\overline{v}_i$ represents the average wind speed within the azimuth i; and $v_i$, represents a wind speed of an $x^{th}$ measurement within the azimuth i.

Then, a prediction model for effective coverage performance of the fixed fire monitor is established, and the external wind direction and the external wind speed that are determined by the confidence determining model for the wind environment fluctuation are input into the prediction model for the effective coverage performance of the fixed fire monitor to determine whether the range of the fire monitor effectively covers the entire area of the converter transformer 1. A specific process is as follows:

An initial spray speed of the fire monitor is obtained according to formula $$v_p = \frac{Q_{flow}\varphi}{\pi r^2}.$$

In the above formula, r represents a radius of a barrel, φ represents a gas-liquid ratio, and $Q_{flow}$ represents a flow of foam mixed liquid.

A speed under a coupling condition of the fire monitor and a wind speed is obtained according to formula $v_o=\sqrt{(v_p\cos\theta+v_f\cos\beta)^2+(v_p\sin\theta+v_f\sin\beta)^2}$. In the above formula, $v_o$ represents the speed under the coupling condition of the fire monitor and the wind speed, $v_p$ represents the initial spray speed of the fire monitor, θ represents an initial spray angle with a value range of [0°, 360°], $v_f$ represents the external wind speed, and β represents the external wind direction with a value range of [0°, 360°].

A theoretical range of a coverage area of the fire monitor is obtained according to formula $L=v_0t$. In the above formula, t represents required time from release of foam to falling of the foam to the ground and $$t = \sqrt{\frac{2H_1}{g}},$$

$H_1$ represents a layout height of the fire monitor, and g represents a gravity acceleration.

An actual range of the coverage area of the fire monitor is obtained according to formula $$L_0 = \lambda\sqrt{(v_p\cos\theta + v_f\cos\beta)^2 + (v_p\sin\theta + v_f\sin\beta)^2}\sqrt{\frac{2H_1}{g}}.$$

In the above formula, λ represents a correction coefficient.

An actual spray angle of the fire monitor under an impact of external wind is obtained according to formula $$\cos\alpha = \frac{v_p\cos\theta + v_f\cos\beta}{v_o}.$$

An actually required range for flaming converter transformer 1 is obtained according to formula $$L_{required} = \frac{L_1}{\cos\alpha}.$$

In the above formula, $L_1$ represents a distance from the fire monitor to formula a farthest side of firewall 2 of the flaming converter transformer 1.

When $L_0 \geq L_{required}$, under the initial spray speed and the initial spray angle of the fire monitor, the external wind speed, and the external wind direction, it is determined that the range of the fire monitor effectively covers the entire area of the converter transformer 1.

When $L_0 < L_{required}$, under the initial spray speed and the initial spray angle of the fire monitor, the external wind speed, and the external wind direction, it is determined that the range of the fire monitor cannot effectively cover the entire area of the converter transformer 1. In this case, the upper computer control system 8 first controls the fire monitor to increase a sprayed flow to a maximum value to increase a spray speed. The above steps are performed to continuously determine whether the range of the fire monitor effectively covers the entire area of the converter transformer 1. If the entire area of the converter transformer 1 still cannot be effectively covered, it is finally determined that the range of the fire monitor cannot effectively cover the entire area of the converter transformer 1, and the following steps are performed.

After it is determined whether the range of the fire monitor effectively covers the entire area of the converter transformer 1, if the range of the fire monitor effectively covers the entire area of the converter transformer 1, first compressed air foam generation subsystem 5 and second compressed air foam generation subsystem 7 are started, such that first fire monitor 4 to which the first compressed air foam generation subsystem 5 belongs and second fire monitor 6 to which the second compressed air foam generation subsystem 7 belongs are automatically preset, and a remote stand of the fire monitor is fixed to extinguish a fire. The remote stand of the fire monitor is an operation console.

If the range of the fire monitor cannot effectively cover the entire area of the converter transformer 1, if the first fire monitor 4 does not meet a range requirement, the first fire monitor 4 is replaced with mobile fire-fighting robot 18 to extinguish the fire. If the second fire monitor 6 does not meet a range requirement, the second fire monitor 6 is replaced with the mobile fire-fighting robot 18 to extinguish the fire. If both the first fire monitor 4 and the second fire monitor 6 do not meet a range requirement, the first fire monitor 4 and the second fire monitor 6 are replaced with two mobile fire-fighting robots 18 respectively to extinguish the fire.

The operation control method suitable for a fire extinguishing system of an extra-high voltage converter station in the present disclosure is mainly applied to the fire extinguishing system of the extra-high voltage converter station. In order to clearly demonstrate the control method in the present disclosure, the following describes arrangement of the extra-high voltage converter station and the fire extinguishing system of the extra-high voltage converter station to describe an entire working process of the present disclosure in detail.

Figure 6:
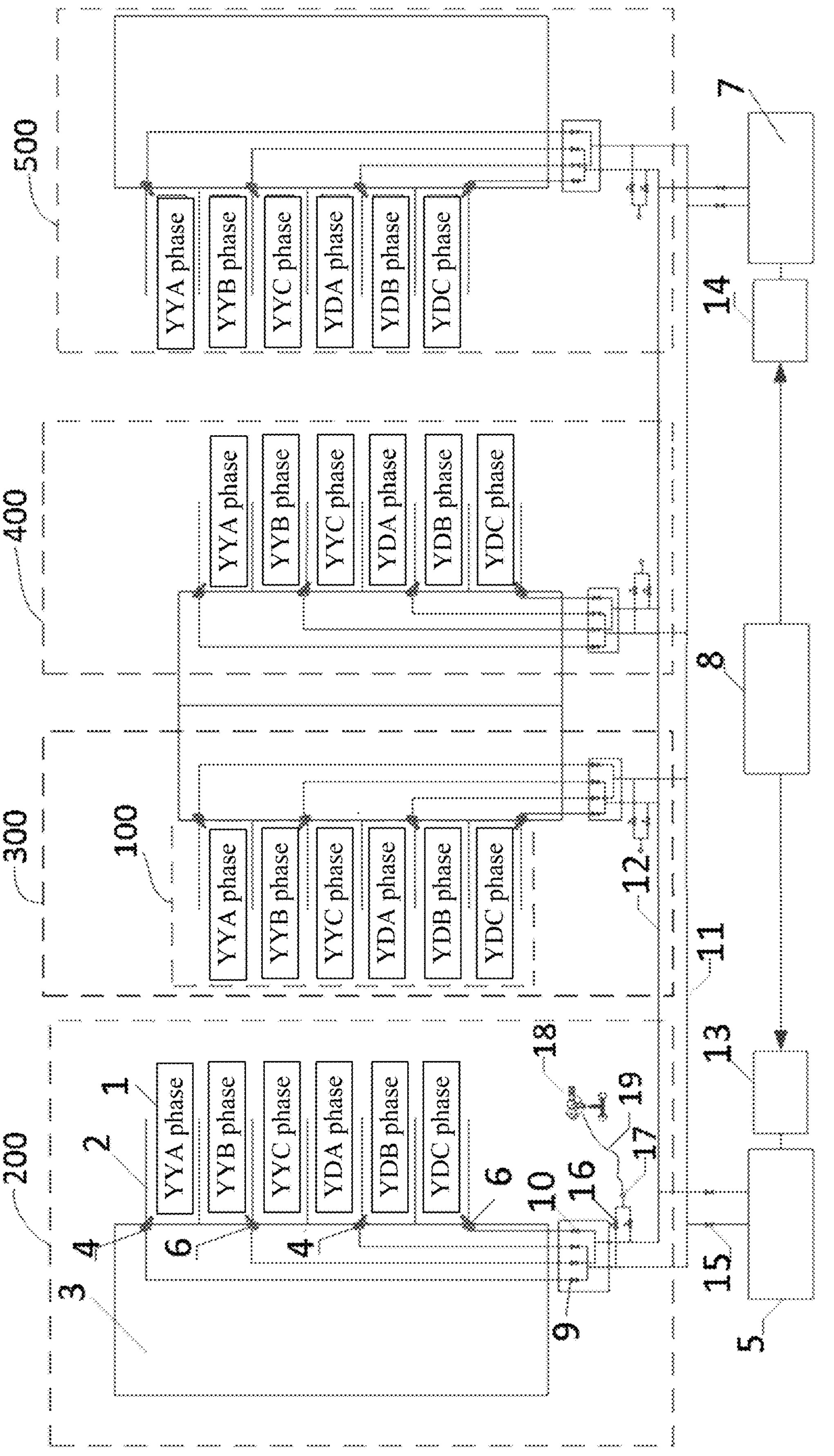
FIG. 6 is an arrangement diagram of a fire extinguishing system of an extra-high converter station in an operation control method suitable for a fire extinguishing system of an extra-high voltage converter station according to an embodiment of the present disclosure.

FIG. 6 shows a specific configuration of an operating extra-high voltage converter station. A fire extinguishing system is disposed in the operating extra-high voltage converter station. The operating extra-high voltage converter station includes a plurality groups of single valve group converter transformers 100 disposed parallel to each other. Each single valve group converter transformer 100 includes a plurality of converter transformers 1 disposed at equal intervals. Adjacent converter transformers 1 are separated by firewall 2, and valve hall 3 is disposed parallel to a back side of each single valve group converter transformer 100. The single valve group converter transformer 100 and the corresponding valve hall 3 form a pole as a whole, and two poles form a group of poles. Each group of poles include a high-end valve group and a low-end valve group. Within a same group of poles, two poles are disposed in mirror symmetry. Low-end valve groups or high-end valve groups of adjacent groups of poles are back-to-back disposed. A sleeve on a side of the valve hall 3 of each converter transformer 1 extends into the corresponding valve hall 3 of the converter transformer 1. As shown in FIG. 6, in this embodiment, the operating extra-high voltage converter station includes four poles sequentially disposed in parallel: high-end valve group 200 of pole 1, low-end valve group 300 of the pole 1, low-end valve group 400 of pole 2, and high-end valve group 500 of the pole 2. Th high-end valve group 200 and the low-end valve group 300 of the pole 1 are disposed in mirror symmetry, the high-end valve group and the low-end valve group 400 of the pole 2 are disposed in mirror symmetry, and the low-end valve group 300 of the pole 1 and the low-end valve group 400 of the pole 2 are back-to-back disposed. Each single valve group converter transformer 100 has six converter transformers 1, and adjacent converter transformers 1 are separated by the firewall 2 and are disposed at equal intervals.

Referring to FIG. 6, the fire extinguishing system of the extra-high voltage converter station includes a first foam fire monitor extinguishing system, a second foam fire monitor extinguishing system, and upper computer control system 8. The first foam fire monitor extinguishing system includes first fire monitor 4 and first compressed air foam generation subsystem 5. The second foam fire monitor extinguishing system includes second fire monitor 6 and second compressed air foam generation subsystem 7. Both the first compressed air foam generation subsystem 5 and the second compressed air foam generation subsystem 7 are compressed air foam generation subsystems. Both a fire extinguishing medium output by the first compressed air foam generation subsystem 5 and a fire extinguishing medium output by the second compressed air foam generation subsystem 7 are compressed air foam.

The first fire monitor 4 and the second fire monitor 6 are located on an eave of the valve hall 3 right above the firewall 2. The first fire monitor 4 and the second fire monitor 6 are alternately disposed. Each two converter transformers 1 correspond to one first fire monitor 4 and one second fire monitor 6. During fire extinguishing, release directions of extinguishing media from the first fire monitor 4 and the second fire monitor 6 both point towards a center position of the converter transformers 1 corresponding to the first fire monitor 4 and the second fire monitor 6.

One end that is of each single valve group converter transformer 100 and close to the first compressed air foam generation subsystem 5 and the second compressed air foam generation subsystem 7 is provided with first partition selection valve 9 and second partition selection valve 10. All first fire monitors 4 in the single valve group converter transformer 100 are connected to the first partition selection valve 9 through a pipe, and all first partition selection valves 9 in the operating extra-high voltage converter station are connected to first foam supply pipe 11. The second fire monitor 6 in the single valve group converter transformer 100 is connected to the second partition selection valve 10 through a pipe, and all second partition selection valves 10 in the operating extra-high voltage converter station are connected to second foam supply pipe 12. The first compressed air foam generation subsystem 5 is separately connected to the first foam supply pipe 11 and the second foam supply pipe 12 through electric valve 15, and the second compressed air foam generation subsystem 7 is separately connected to the first foam supply pipe 11 and the second foam supply pipe 12. The first compressed air foam generation subsystem 5 is electrically connected to the upper computer control system 8 through first local control cabinet 13, and the second compressed air foam generation subsystem 7 is electrically connected to the upper computer control system 8 through second local control cabinet 14.

When a compressed air foam generation subsystem fails, a compressed air foam generation subsystem that can work normally supplies foam to both the first fire monitor 4 and the second fire monitor 6, so as to ensure full coverage of flaming converter transformer 1. It should be noted that when the two fire extinguishing systems are normal, one compressed air foam generation subsystem supplies foam to the first fire monitor 4, and the other compressed air foam generation subsystem supplies foam to the second fire monitor 6, which ensures an output of compressed air foam to effectively extinguish a fire. However, when a single compressed air foam generation subsystem fails, it is most important to ensure that a spray range covers the entire converter transformer 1, because the fire can be extinguished only when the entire converter transformer 1 is covered. A requirement for the foam output is secondary. Therefore, the compressed air foam generation subsystem that can work normally is used to supply foam to both the first fire monitor 4 and the second fire monitor 6 that are disposed above the flaming converter transformer 1.

As a further improvement scheme, the first compressed air foam generation subsystem 5 and the second compressed air foam generation subsystem 7 are disposed far away from an area in which the converter transformer 1 is located. In this embodiment, the first compressed air foam generation subsystem 5 is disposed in a plaza of the pole 1 of the operating extra-high voltage converter station, and the second compressed air foam generation subsystem 7 is disposed in a plaza of the pole 2 of the operating extra-high voltage converter station. Both the plaza of the pole 1 and the plaza of the pole 2 are far away from the converter transformer 1. When the converter transformer 1 catches fire, it is very easy to cause an explosion to damage the pipe, the fire monitor, and the like. If the compressed air foam generation subsystem is close to the converter transformer 1, it is easy to cause a system damage, and no foam can be produced. When the compressed air foam generation subsystem is disposed far away from the converter transformer 1, even if the explosion occurs and the fire monitor is damaged, foam can still be produced by the compressed air foam generation subsystem and supplied to a position of the flaming converter transformer 1 through the pipe.

A working process of the present disclosure is as follows: As shown in FIG. 6, four fire monitors are disposed at intervals in the single valve group converter transformer 100. Two fire monitors are disposed above each two adjacent converter transformers 1, where one fire monitor is provided with foam by the first compressed air foam generation subsystem 5 and the other fire monitor is provided with foam by the second compressed air foam generation subsystem 7. For example, in FIG. 6, from bottom to top, the first and third fire monitors are connected to the first compressed air foam generation subsystem 5, and the second and fourth fire monitors are connected to the second compressed air foam generation subsystem 7. The fire monitor disposed on the eave of the valve hall 3 can achieve undifferentiated coverage for each converter transformer 1. The two compressed air foam generation subsystems are respectively disposed in the plazas of the poles of the operating extra-high voltage converter station.

When the converter transformer 1 of a YYA phase in the high-end valve group of the pole 1 catches fire, if a range of the fire monitor effectively covers an entire area of the converter transformer, the two compressed air foam generation subsystems are started. Then, a valve chest is selected to automatically open partition selection valves in which fire monitors ③ and ④ are located (in FIG. 7, for each single valve group converter transformer 100, the first to the fourth fire monitors are sequentially numbered from bottom to up), which are close to the converter transformer 1 of the YYA phase. The first compressed air foam generation subsystem 5 located in the plaza of the pole 1 gives priority to providing compressed air foam to the fire monitor ④ right above an eave of the converter transformer 1 of the YYA phase, while the second compressed air foam generation subsystem 7 located in the plaza of the pole 2 provides compressed air foam to the fire monitor ③.

Figure 8:
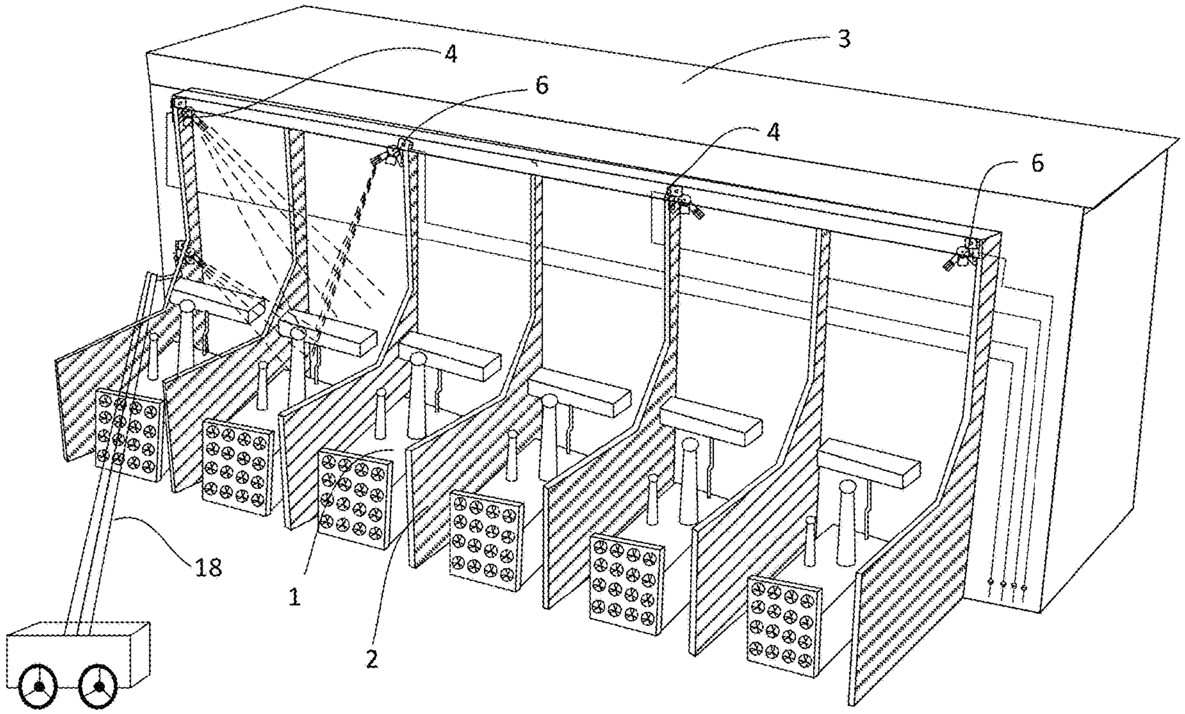
FIG. 8 is a schematic diagram of fire extinguishing of a converter transformer of a YDB phase in a single valve group converter transformer in an operation control method suitable for a fire extinguishing system of an extra-high voltage converter station according to an embodiment of the present disclosure.

As shown in FIG. 8, when the converter transformer 1 of a YDB phase in the low-end valve group of the pole 2 catches fire, fire monitors ① and ② closest to this phase are started. The fire monitor ② is provided with compressed air foam by the second compressed air foam generation subsystem 7 located in the plaza of the pole 2, while the fire monitor ① is provided with compressed air foam by the first compressed air foam generation subsystem 5 located in the plaza of the pole 1.

Figure 9:
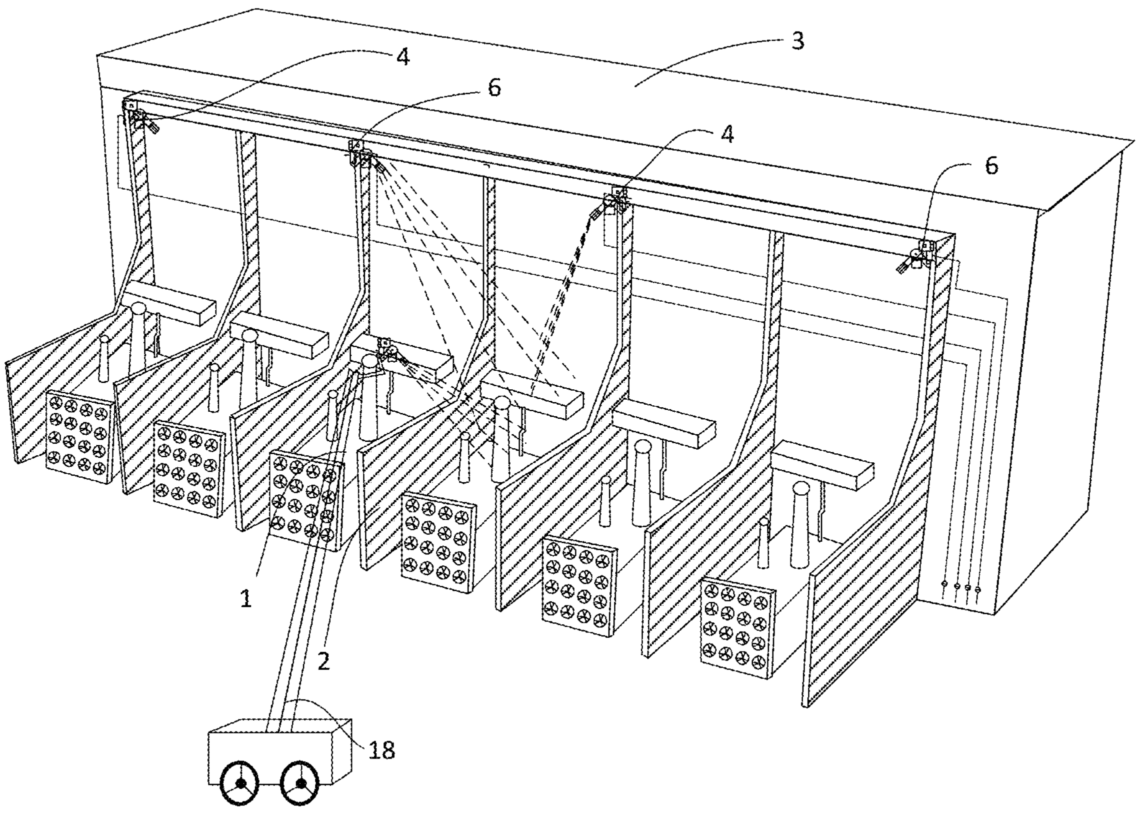
FIG. 9 is a schematic diagram of fire extinguishing of a converter transformer of a YYC phase in a single valve group converter transformer in an operation control method suitable for a fire extinguishing system of an extra-high voltage converter station according to an embodiment of the present disclosure.

Similarly, as shown in FIG. 9, when a converter transformer of a YYC phase catches fire, the corresponding fire monitors ② and ③ are started.

If the range of the fire monitor cannot effectively cover the entire area of the converter transformer, mobile fire-fighting robot 18 is required to participate in fire extinguishing. The fire extinguishing system of the extra-high voltage converter station also includes a first redundant connection interface (not shown in the figure) and a second redundant connection interface (not shown in the figure). The first redundant connection port is a redundant interface of the first foam supply pipe 11, which extends to an area of a plaza of the converter transformer 1. The second redundant connection interface is a redundant interface of the second foam supply pipe 12, which extends to the area of the plaza of the converter transformer 1. The first redundant connection interface and the second redundant connection interface have a same size and shape. The first redundant connection interface is connected to external interface 17 through one manual gate valve 16, and the second redundant interface is connected to the external interface 17 through another manual gate valve 16.

The fire extinguishing system of the extra-high voltage converter station further includes the mobile fire-fighting robot 18. The mobile fire-fighting robot 18 is connected to water hose 19. The water hose 19 has a bayonet that is matched with the first redundant connection interface and the second redundant connection interface. The bayonet is clamped with the external interface 17. The fire extinguishing medium is obtained through the first redundant connection interface or the second redundant connection interface and moved to a predetermined area for directional fire extinguishing.

Figure 5:
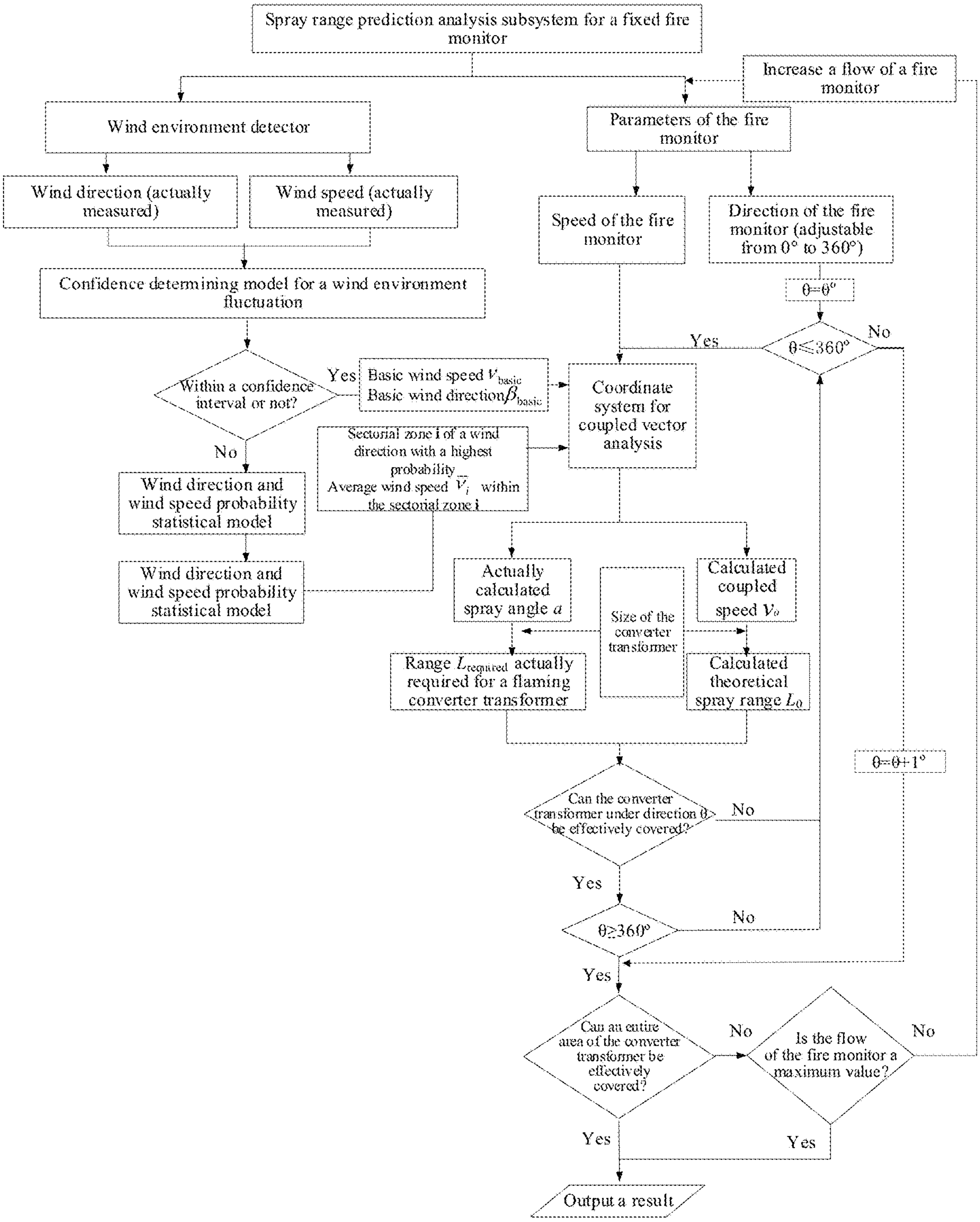
FIG. 5 shows a workflow of a prediction analysis system for effective coverage of a spray range of a fixed monitor in an operation control method suitable for a fire extinguishing system of an extra-high voltage converter station according to an embodiment of the present disclosure.
Figure 7:
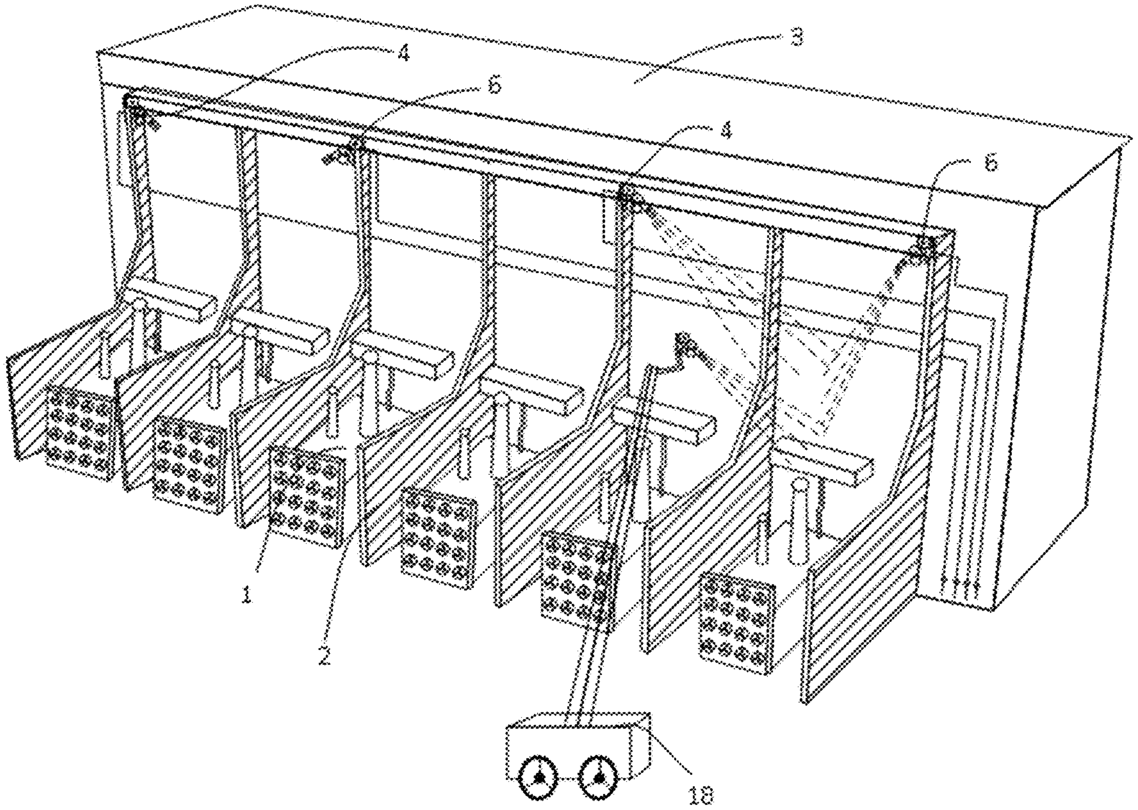
FIG. 7 is a schematic diagram of fire extinguishing of a converter transformer of a YYA phase in a single valve group converter transformer in an operation control method suitable for a fire extinguishing system of an extra-high voltage converter station according to an embodiment of the present disclosure.

As shown in FIG. 6 and FIG. 7, when the fire monitor ③ or ④ in the single valve group converter transformer 100 is affected by an external wind environment and other factors and fails to spray well, for example, when the converter transformer 1 of the YYA phase in the high-end valve group of the pole 1 catches fire, and a spraying effect of the fire monitor ③ or ④ is poor, the mobile fire-fighting robot 18 is connect to a fire main connection interface reserved in the plaza of the pole 1, namely, the external interface 17, and moves to a predetermined area to achieve fire extinguishing for the YYA phase. When the converter transformer 1 of the YYA phase in the high-end valve group of the pole 2 catches fire, and the spraying effect of the fire monitor ③ or ④ is poor, the mobile fire-fighting robot 18 is connected to a fire main connection interface reserved in the plaza of the pole 2, namely, the external interface 17, and moves to a predetermined area to achieve fire extinguishing for the converter transformer 1 of the YYA phase. A specific effect is shown in FIG. 5. The mobile fire-fighting robot 18 is RXR-M40L-16CA produced by Jiujiang Zhongchuan Fire Protection Equipment Co., Ltd.

The foregoing embodiments are only used to explain the technical solutions of the present disclosure, and are not intended to limit the same. Although the present disclosure is described in detail with reference to the foregoing embodiments, those of ordinary skill in the art should understand that they can still modify the technical solutions described in the foregoing embodiments, or perform equivalent substitutions on some technical features therein. These modifications or substitutions do not make the essence of the corresponding technical solutions deviate from the spirit and scope of the technical solutions of the embodiments of the present disclosure.

What is claimed is:

1. An operation control method suitable for a fire extinguishing system of a voltage converter station, wherein the fire extinguishing system of the voltage converter station comprises a first foam fire monitor extinguishing system, a second foam fire monitor extinguishing system, and an upper computer control system, the first foam fire monitor extinguishing system comprises a first fire monitor and a first compressed air foam generation subsystem, and the second foam fire monitor extinguishing system comprises a second fire monitor and a second compressed air foam generation subsystem; and the method comprises:

after the upper computer control system receives a sound-light alarm signal, an alarm position signal, and a switch position dividing signal, starting a spray range prediction analysis subsystem for a fixed fire monitor;

determining, by the spray range prediction analysis subsystem for the fixed fire monitor based on an external wind direction and an external wind speed, whether a range of the first and second fire monitors effectively covers an entire area of a converter transformer; and if yes, starting the first compressed air foam generation subsystem and the second compressed air foam generation subsystem, such that the first fire monitor to which the first compressed air foam generation subsystem belongs and the second fire monitor to which the second compressed air foam generation subsystem belongs are automatically preset, and fixing a remote stand of the first and second fire monitors to extinguish a fire; or if no, if the first fire monitor does not meet a range requirement, replacing the first fire monitor with a first mobile fire-fighting robot to extinguish the fire; if the second fire monitor does not meet the range requirement, replacing the second fire monitor with the first mobile fire-fighting robot or a second mobile fire-fighting robot to extinguish the fire; or if both the first fire monitor and the second fire monitor do not meet the range requirement, replacing the first fire monitor and the second fire monitor with the first and second mobile fire-fighting robots respectively to extinguish the fire.

2. The operation control method suitable for the fire extinguishing system of the voltage converter station according to claim 1, wherein the upper computer control system receiving the sound-light alarm signal, the alarm position signal, and the switch position dividing signal comprises: obtaining signal data from two cable thermal detectors and two flame detectors through alarm coupling, performing, by a combined alarm controller, independent determining based on a two-out-of-three principle to output the sound-light alarm signal and the alarm position signal, and outputting the switch position dividing signal through an on-off action by a circuit breaker of a single valve group converter transformer and automatic power off by the single valve group converter transformer.

3. The operation control method suitable for the fire extinguishing system of the voltage converter station according to claim 2, wherein the two-out-of-three principle comprises: at least one flame detector of the two flame detectors emits an action signal, indicating that action signal output is present in the flame detector side; the two flame detectors act as one output to form three outputs together with the two cable thermal detectors; and when at least two of the three outputs emit an action signal, the combined alarm controller alarms.

4. The operation control method suitable for the fire extinguishing system of the voltage converter station according to claim 1, wherein the spray range prediction analysis subsystem for the fixed fire monitor is built in the upper computer control system.

5. The operation control method suitable for the fire extinguishing system of the voltage converter station according to claim 1, wherein the operation of determining, by the spray range prediction analysis subsystem for the fixed fire monitor based on the external wind direction and the external wind speed, whether the range of the first and second fire monitors effectively covers the entire area of the converter transformer comprises:

establishing a confidence determining model for a wind environment fluctuation;

determining the external wind direction and the external wind speed based on the confidence determining model for the wind environment fluctuation;

establishing a prediction model for effective coverage performance of the fixed fire monitor; and inputting the external wind direction and the external wind speed that are determined by the confidence determining model for the wind environment fluctuation into the prediction model for the effective coverage performance of the fixed fire monitor to determine whether the range of the first and second fire monitors effectively covers the entire area of the converter transformer.

6. The operation control method suitable for the fire extinguishing system of the extra voltage converter station according to claim 5, wherein the operation of establishing the confidence determining model for the wind environment fluctuation comprises:

obtaining a basic wind speed according to a formula $$v_{basic} = \frac{\sum_{t_i=1}^{t_i=n} v_{ft_i}}{n},$$

wherein $v_{basic}$ represents the basic wind speed;

$$v_{ft_i}$$

represents a win speed at a time point $t_i$; and n represents a quantity of times that a wind speed detector takes a value;

obtaining a confidence value of a wind speed fluctuation according to a formula $$\eta = \left|\frac{v_{ft_i} - v_{basic}}{v_{basic}}\right|,$$

wherein

η represents the confidence value of the wind speed fluctuation;

obtaining a basic wind direction according to a formula $$\beta_{basic} = \frac{\sum_{t_i=1}^{t_i=n} \beta_{t_i}}{n},$$

wherein $\beta_{basic}$ represents the basic wind direction; and $\beta_{t_i}$ represents a wind direction at the time point $t_i$; and obtaining a confidence value of a wind direction angle fluctuation according to a formula $$\lambda = \left|\frac{\beta_{t_i} - \beta_{basic}}{\beta_{basic}}\right|,$$

wherein

λ represents the confidence value of the wind direction angle fluctuation.

7. The operation control method suitable for the fire extinguishing system of the voltage converter station according to claim 6, wherein the operation of determining the external wind direction and the external wind speed based on the confidence determining model for the wind environment fluctuation comprises:

when both the confidence value η of the wind speed fluctuation and the confidence value λ of the wind direction angle fluctuation are less than a preset value, determining that the external wind speed and the external wind direction are stable, using the basic wind speed $v_{basic}$ as the external wind speed, and using the basic wind direction $\beta_{basic}$ as the external wind direction; and when both the confidence value η of the wind speed fluctuation and the confidence value λ of the wind direction angle fluctuation are greater than the preset value, determining that the external wind speed or the external wind direction fluctuates greatly, and a degree of an impact of an external wind environment on the fixed fire monitor also increases, obtaining 12 sectorial azimuth zones through division by a wind direction and wind speed probability statistical model by taking every 30° as a statistical azimuth to take wind direction statistics, taking a wind direction with a highest statistical probability as a reference wind direction, taking a statistical mean of wind speeds in a sectorial zone in which the reference wind direction is located as a reference wind speed, using the reference wind speed as the external wind speed, and using the reference wind direction as the external wind direction.

8. The operation control method suitable for the fire extinguishing system of the voltage converter station according to claim 7, wherein the wind direction and wind speed probability statistical model comprises:

obtaining a frequency of a wind direction appearing in an azimuth i according to a formula $$f_i = \frac{n_i}{k} * 100\%,$$

wherein $f_i$ represents the frequency of the wind direction appearing in the azimuth i; $n_i$ represents a quantity of times that the wind direction appears in the azimuth i; and k represents a total quantity of azimuth records of the wind direction;

obtaining a highest frequency of the wind direction in the 12 sectorial azimuth zones according to a formula $f_{max}$=MAX $[f_1, f_2, \ldots, f_{12}]$, wherein $f_1$ represents a frequency of the wind direction in an azimuth 1; $f_2$ represents a frequency of the wind direction in an azimuth 2; and $f_{max}$ represents the highest frequency of the wind direction in the 12 sectorial azimuth zones; and obtaining an average wind speed within the azimuth i according to a formula $$\overline{v}_i = \frac{\sum_{x=1}^{x=n_1} v_{1_x}}{n_i},$$

wherein $\overline{v}_i$ represents the average wind speed within the azimuth i; and $v_{i_x}$ represents a wind speed of an $x^{th}$ measurement within the azimuth i.

9. The operation control method suitable for the fire extinguishing system of the voltage converter station according to claim 5, wherein the operation of establishing the prediction model for the effective coverage performance of the fixed fire monitor comprises:

obtaining an initial spray speed of the fixed fire monitor according to a formula $$v_p = \frac{Q_{flow}\varphi}{\pi r^2},$$

wherein r represents a radius of a barrel, φ represents a gas-liquid ratio, and $Q_{flow}$ represents a flow of foam mixed liquid;

obtaining a speed under a coupling condition of the fixed fire monitor and a wind speed according to a formula $v_o = \sqrt{(v_p\cos\theta+v_f\cos\beta)^2+(v_p\sin\theta+v_f\sin\beta)^2}$, wherein $v_o$ represents the speed under the coupling condition of the fixed fire monitor and the wind speed, $v_p$ represents the initial spray speed of the fixed fire monitor, θ represents an initial spray angle with a value range of [0°, 360°], $v_f$ represents the external wind speed, and β represents the external wind direction with a value range of [0°, 360°];

obtaining a theoretical range of a coverage area of the fixed fire monitor according to a formula $L=v_0t$, wherein t represents required time from release of foam to falling of the foam to the ground and $$t = \sqrt{\frac{2H_1}{g}},$$

$H_1$ represents a layout height of the fixed fire monitor, and g represents a gravity acceleration;

obtaining an actual range of the coverage area of the fixed fire monitor according to a formula $$L_0 = \lambda\sqrt{(v_p\cos\theta + v_f\cos\beta)^2 + (v_p\sin\theta + v_f\sin\beta)^2}\sqrt{\frac{2H_1}{g}},$$

wherein λ represents a correction coefficient;

obtaining an actual spray angle of the fixed fire monitor under an impact of external wind according to a formula $$\cos\alpha = \frac{v_p\cos\theta + v_f\cos\beta}{v_a};$$

and obtaining an actually required range for a flaming converter transformer according to a formula $$L_{required} = \frac{L_1}{\cos\alpha},$$

wherein $L_1$ represents a distance from the fixed fire monitor to a farthest side of a firewall of the flaming converter transformer.

10. The operation control method suitable for the fire extinguishing system of the voltage converter station according to claim 9, wherein the operation of inputting the external wind direction and the external wind speed that are determined by the confidence determining model for the wind environment fluctuation into the prediction model for the effective coverage performance of the fixed fire monitor to determine whether the range of the first and second fire monitors effectively covers the entire area of the converter transformer comprises:

when $L_0 \geq L_{required}$, under the initial spray speed and the initial spray angle of the fixed fire monitor, the external wind speed, and the external wind direction, determining that the range of the fixed fire monitor effectively covers the entire area of the converter transformer; or when $L_0 < L_{required}$, under the initial spray speed and the initial spray angle of the fixed fire monitor, the external wind speed, and the external wind direction, determining that the range of the fixed fire monitor cannot effectively cover the entire area of the converter transformer.

* * * * *